United States Patent [19]

Hawkins et al.

[11] 4,160,456
[45] Jul. 10, 1979

[54] 2-SPEED ROTOR GEAR CASE

[75] Inventors: Robert W. Hawkins, Rapids City; Paul G. Togami, East Moline; T. Gary Drayer, Silvis, all of Ill.

[73] Assignee: International Harvester Company, Chicago, Ill.

[21] Appl. No.: 833,775

[22] Filed: Sep. 16, 1977

[51] Int. Cl.² .............................................. A01F 12/56
[52] U.S. Cl. ............................ 130/27 T; 74/242.15 R; 74/339; 130/27 R
[58] Field of Search ........................... 130/27 R, 27 T; 56/14.6; 74/230.17 M, 242.8, 242.15 R, 339, 473 R

[56] References Cited

U.S. PATENT DOCUMENTS

| 2,688,880 | 9/1954 | Vutz | 74/242.15 R |
| 3,362,445 | 1/1968 | Butzin et al. | 74/242.15 R |
| 3,364,768 | 1/1968 | Powell | 74/339 |
| 3,375,738 | 4/1968 | Love | 130/27 T |
| 3,478,851 | 11/1969 | Smyth et al. | 74/339 |
| 3,543,767 | 12/1970 | Witzel | 130/27 R |
| 3,543,897 | 12/1970 | Lemke et al. | 74/339 |
| 3,807,413 | 4/1974 | Jacobs et al. | 130/27 T |
| 3,881,370 | 5/1975 | Vogelaar et al. | 74/230.17 M |
| 3,922,927 | 12/1975 | Shiki et al. | 74/242.15 R |
| 3,982,549 | 9/1976 | De Pauw et al. | 130/27 T |

Primary Examiner—Jay N. Eskovitz
Attorney, Agent, or Firm—F. David AuBuchon

[57] ABSTRACT

A dual speed gear case mechanism adapted to drive the rotor of an axial flow combine and which receives its power from the combine engine. The mechanism includes a housing which is tiltably mounted on the chassis of the combine and has a rearwardly projecting input shaft which carries a variable diameter torque sensing V-belt sheave and a forwardly projecting output shaft connected in driving relationship to the combine rotor, the two shafts being offset from each other. Speed-change gearing within the housing is controlled by a shift fork having external operating connections. The housing tilts about the axis of the output shaft so that the input shaft may be adjusted toward and away from its associated drive sheave for V-belt tensioning purposes. Gauge mechanism is provided for facilitating a determination of the correct inclination of the gear case housing to attain proper V-belt tension.

14 Claims, 9 Drawing Figures

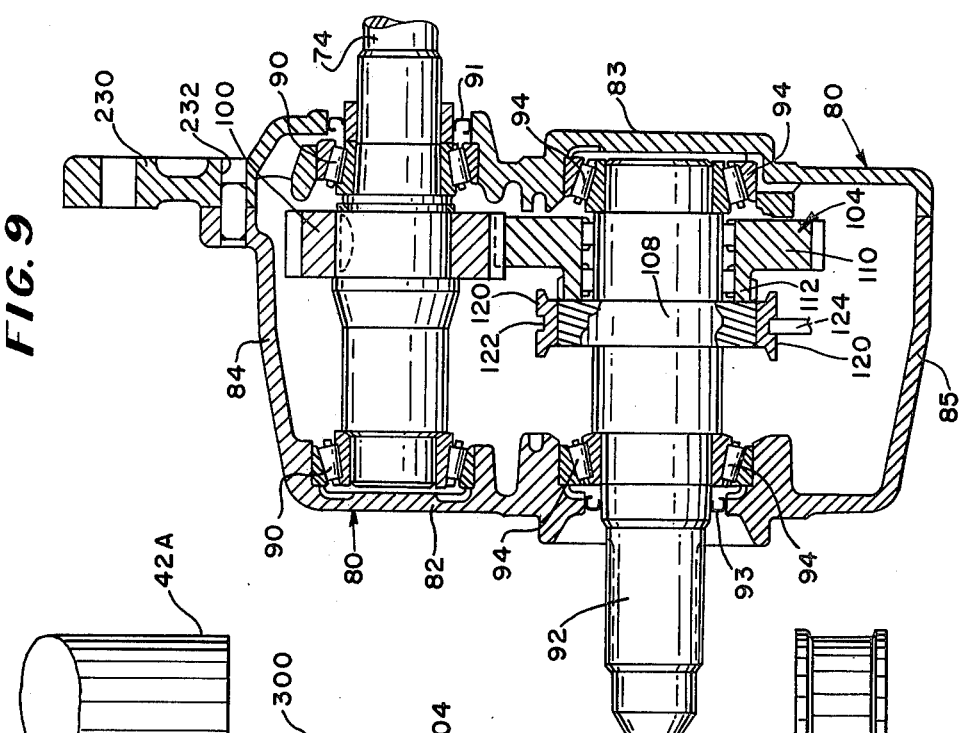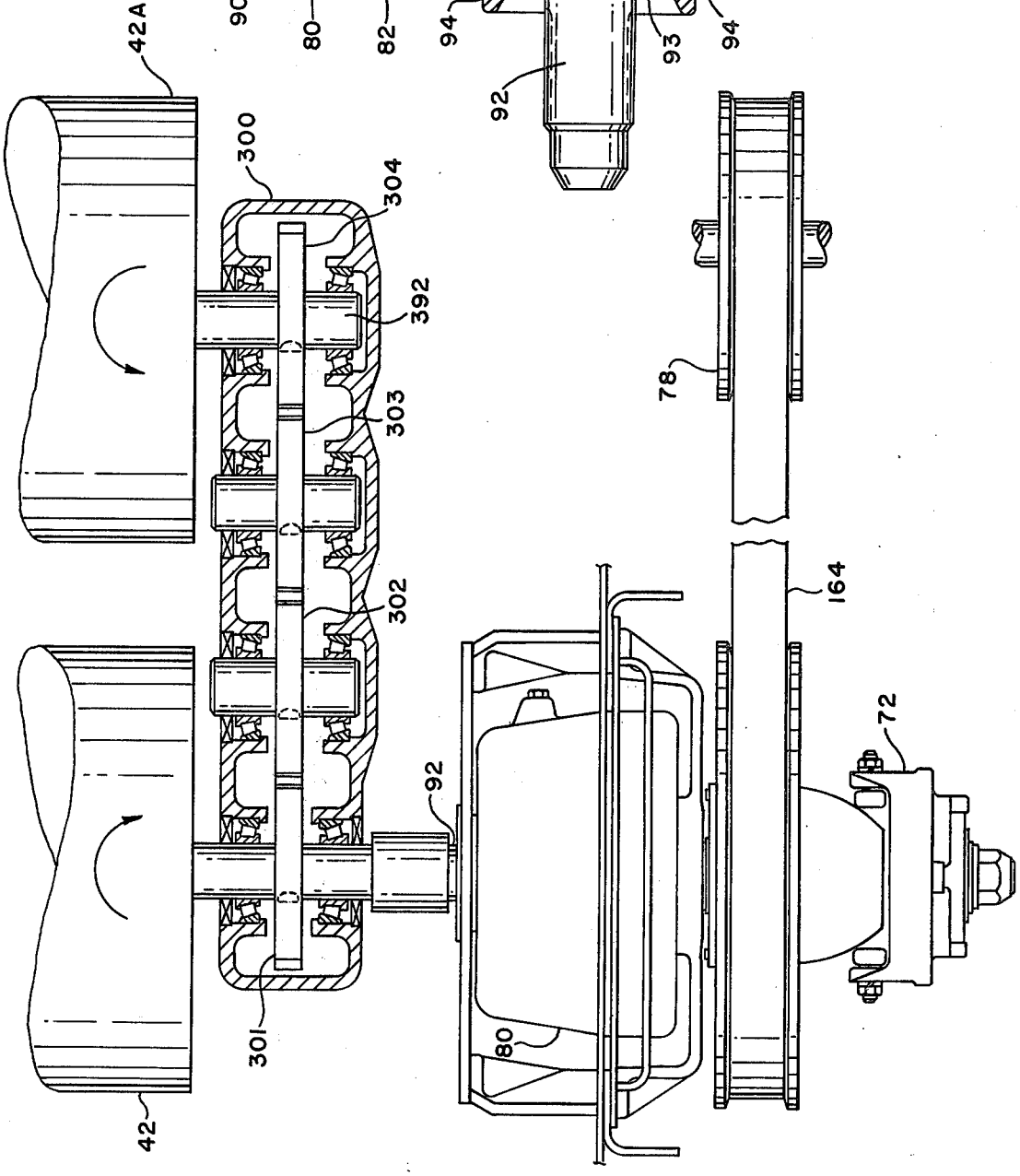

2-SPEED ROTOR GEAR CASE

The improved dual speed gear case mechanism comprising the present invention has been designed for use primarily as a transmission assembly in connection with the driving of the threshing rotor of a harvesting combine, especially a combine of the axial flow type.

Heretofore, in connection with harvesting combines, a sudden increase in the load imposed upon the rotor, occasioned for example by the deposition of a large mat or quantity of the material undergoing threshing in the combine concave, has resulted in slipping of a V-belts which are employed in the transmission mechanisms which are employed to connect the combine rotor to the engine, thus resulting in shortened belt life. In an effort to overcome this difficulty, there have been devised special torque sensitive transmissions which include a torque sensing sheave that respond to the loads exerted thereon so that the belt diameters thereof are automatically varied in proportion to the magnitude of the loads involved. Such a sheave includes an axially fixed sheave section and an axially slidable sheave section which, when moved toward the fixed section, causes an effective increase in belt diameter. Thus, an increase in the load will automatically cause movement of the shiftable section toward the fixed section, thus increasing the pressure on the opposite sides of the V-belt so as to inhibit belt slippage, while at the same time increasing the belt diameter.

In belt drive transmissions of this type an initial and fairly critical belt-tensioning adjustment must be made if the sheaves are to operate in the range for which they were designed with maximum efficiency. This initial adjustment frequently will not remain effective after a period of use so that it becomes necessary to resort to a prolonged period of idle time while readjustments are carried out.

The present invention is designed to overcome the above noted limitation that is attendant upon the use of torque sensitive V-belt sheaves in the driving transmissions of combine rotors and, toward this end it contemplates the provision of a novel gear case mechanism by means of which power may be transmitted from the V-belt sheave to the combine rotor in either of two drive speed ratios, while at the same time an adjustment of the V-belt tension may be effected at any time without necessitating any adjustment of the individual parts of the torque sensing sheave itself or of the mechanism associated therewith. The provision of such a gear case mechanism constitutes the principal object of the invention.

In carrying out this object, the invention contemplates the provision of a gear case mechanism embodying a gear case proper in the form of a housing having speed change gearing associated therewith and from which there projects an input shaft on which the variable diameter torque sensitive sheave is mounted. An output shaft also projects from the housing and is designed for connection to the combine rotor in driving relationship. The housing is tiltably mounted for angular turning movement about the axis of the output shaft, the input shaft being offset from the output shaft so that by tilting the housing in one direction or the other, the input shaft, with its torque sensitive V-belt sheave mounted thereon, may be shifted toward and away from the axis of the counterpart driving sheave for the torque sensitive sheave. Releasable means are provided whereby the gear case housing may be secured in selected angular positions, thus varying the distance between the torque sensitive sheave and its associated counterpart sheave, thereby regulating belt tension without necessitating any attention whatsoever to the torque sensing mechanism. Gauge means are associated with the angularly shiftable gear case housing for facilitating a determination of the correct inclination of the housing to attain proper belt tension on the torque sensing V-belt sheave.

It is a further object of the present invention to provide a novel speed change gear mechanism which makes provision for two speed change gear ratios and which, moreover, is provided with novel detent means whereby the gear mechanism may be operated by remote control to attain a high speed gear ratio, a low speed gear ratio, or a neutral condition. When in the neutral condition the gear case output shaft and the combine rotor are free to rotate which greatly facilitates servicing of the combine rotor.

The two speed gear housing enables the combine to be used for a wide vadiety of crops and in various crop conditions, however, some combine users do not require this versatility and would consider this feature to be an unwarrented expense. The same housing, shafts and bearings can be utilized to provide a single speed gear housing having a neutral condition by merely eliminating one of the gear sets.

Although the torque sensitive transmission is described for use with a single rotor axial flow combine it can also be used to drive a multiple rotor axial flow combine as well.

Other objects and advantages of the invention, not at this time enumerated, will become readily apparent as the nature of the invention is better understood.

In the accompanying five sheets of drawings forming a part of this specification, three illustrative embodiment of the invention have been shown.

FIG. 1 is a side elevational view, partly in section, of an axial flow-type harvesting combine with a major portion of one side wall being broken away to reveal the crop-gathering means, the crop-feeding means, the crop-impelling means, the axial threshing and separating means, the grain cleaning and handling means, and the residue discharge means, the view illustrating specifically the preferred positional relationship of the dual-speed gear case mechanism of the present invention relative to the combine engine and rotor;

FIG. 8 is a schematic view showing the torque sensitive transmission driving a dual rotor axial flow combine; and FIG. 9 is a sectional view similar to FIG. 6 showing a single speed gear casing.

Figure 1:
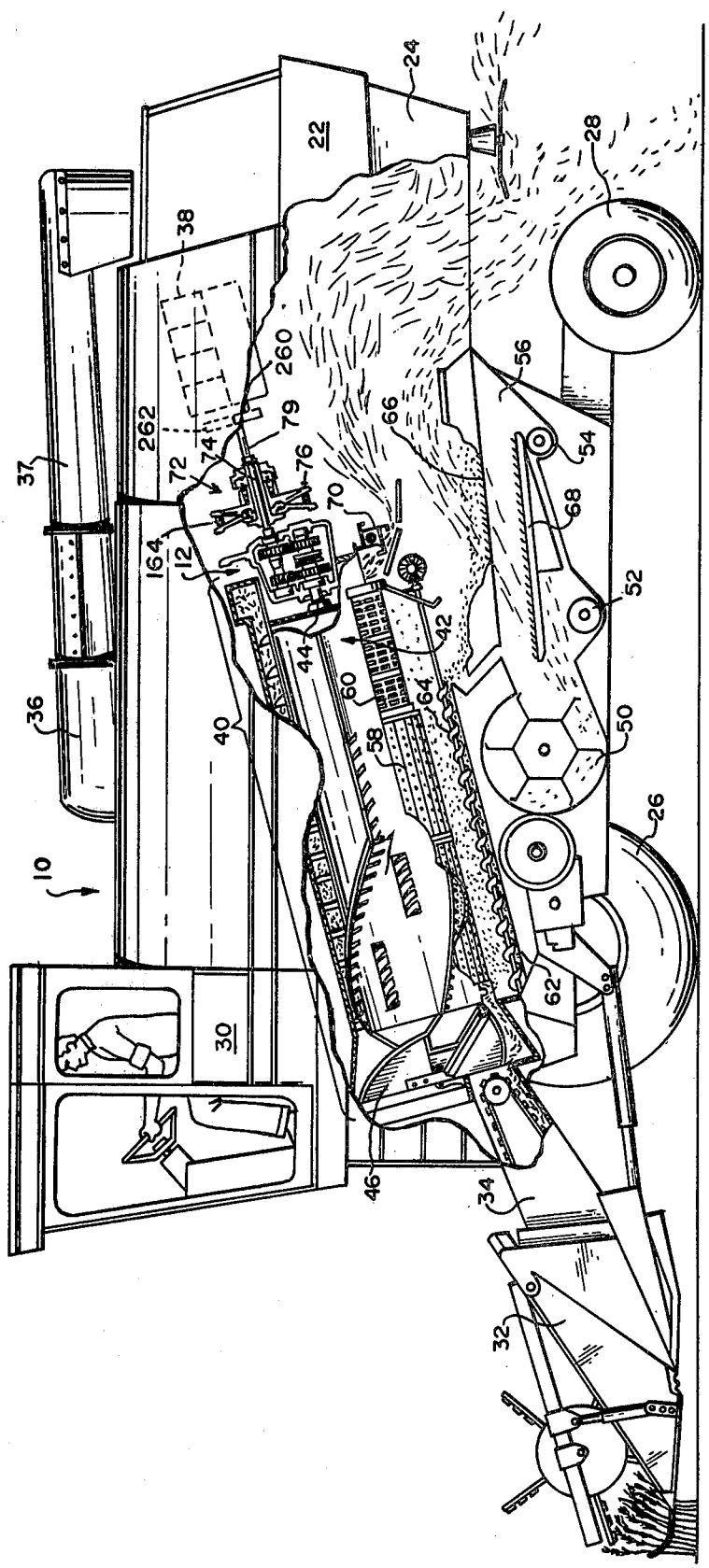

Referring now to the drawings in detail the gear case mechanism of the present invention has been designed particularly for use in connection with the driving of the rotor of an axial flow-type harvesting combine of the general character shown and described in U.S. Pat. No. 3,481,342, granted on Dec. 2, 1969 and entitled AXIAL FLOW-TYPE COMBINE. Accordingly, such a combine is illustrated in FIG. 1 and designed in its entirety by the reference numeral 10. The present dual-speed gear case arrangement, which likewise is designated in its entirety by the reference numeral 12, is shown somewhat schematically in FIGS. 1 and 2 in its correct positional relationship with respect to the combine while the details of such gear case arrangement are particularly shown in the remaining views of the drawings.

The combine 10 involves in its general organization a chassis or body 22 having vertical side walls 24, the body portion being supported by a pair of relatively large driven wheels 26 in the front region of the combine, and a pair of steerable or dirigible wheels 28 at the rear thereof. The combine 10 further includes an operator's platform or cab 30, a crop-gathering header 32, a feeder 34, a grain elevator 36 from which there extends a grain delivery chute 37, and a power source such as an engine 38. A grain tank (not shown) is enclosed within the walls of the body 22.

As is the case in connection with an axial flow-type combine of the character under consideration, the axial threshing and separating means are embodied in an elongated and generally cylindrical member 40 in the form of a rotor casing having a rotor 42 mounted therein, the rotor being provided with a central rotor shaft 44. The forward end of the rotor shaft carries a vaned impeller 46. A rotor such as this is shown and described in U.S. Pat. No. 3,982,548 granted on Sept. 28, 1976 and entitled HELICAL ELEMENT ROTOR-AXIAL FLOW COMBINE. Other conventional components not specifically related to the present invention, and which are more or less schematically illustrated herein, are the blower 50, grain auger 52 leading to the aforementioned grain elevator 36, and a tailings auger 54, these components being enclosed within a lower casing section 56 beneath the chassis or body portion 22. The lower portion of the rotor casing 40 is made up of the usual concave 58 and a grate 60. A conveyor structure 62 having augers 64 associated therewith is disposed beneath the rotor casing 40 and receives threshed and separated grain from the concave and grate sections 58 and 60 and discharges the grain onto a chaffer sieve 66. Such sieve is reciprocated in a fore and aft direction so as to pass the grain and tailings to a grain sieve 68 which also is reciprocated in order to separate the tailings so that the grain passes through the sieve and into the grain auger 52 while the tailings are returned to the rotor casing 40 by elevator means (not shown). A terminal beater 70 at the rear end of the rotor casing 40 prepares the straw residue for discharge from the combine rearwardly thereof.

The arrangement of parts thus far described is purely conventional and no claim is made herein to any novelty associated therewith, the novelty of the present invention residing rather in the nature of the power train which extends from the engine 38 to the rotor shaft 44 and which includes the aforementioned dual speed gear case mechanism 12 and which further includes a V-belt transmission drive mechanism. While a wide variety of V-belt transmission drive mechanisms may be associated with the gear case 12, the latter has been specifically designed for use in connection with particular transmission mechanism in the form of a torque sensing unit 72 which is of the type shown and described in a copending application, Ser. No. 833,776 filed on Sept. 16, 1977 and entitled TORQUE SENSING UNIT FOR DRIVING THE ROTOR OF A HARVESTING COMBINE. Both the dual speed gear case mechanism 12 and the torque sensing unit 72 are specially designed, each for use in connection with the other. However, although some of the details of the torque sensing unit are disclosed herein, particularly in FIG. 3, such unit per se is not considered to be a part of the present invention except insofar as its combination with the gear case arrangement is concerned.

The torque sensing unit 72 is effectively interposed between the combine engine 38 and the dual speed gear case 12, its function being to drive the input shaft of the gear case mechanism by applying power thereto as is required to transmit the necessary torque from the output shaft of the mechanism to the combine rotor shaft 44 and overcome sudden load increases on the combine rotor 42, while at the same time inhibiting V-belt slippage, all in a manner and for purposes that will be made clear subsequently when the nature of both the gear case mechanism 12 and the torque sensing unit 72 are better understood.

Figure 2:
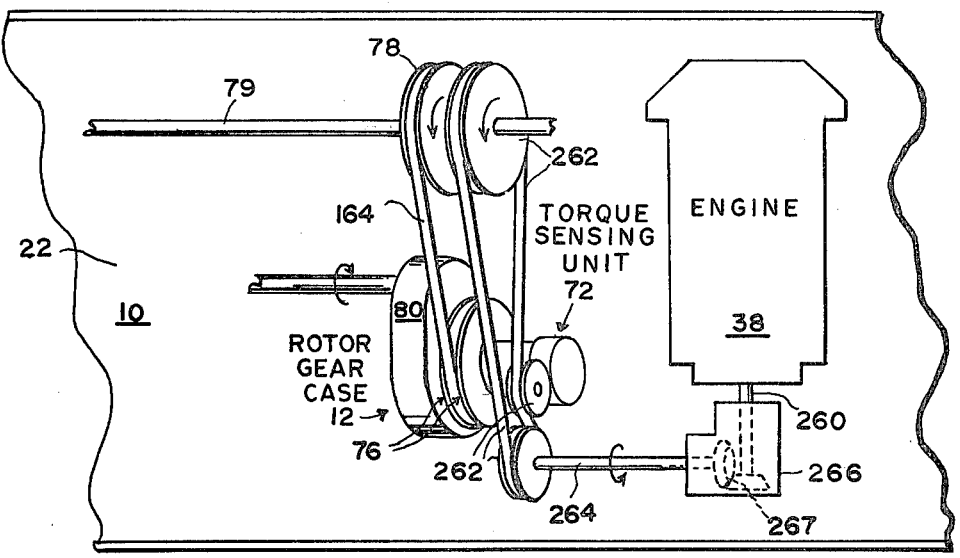
FIG. 2 is a fragmentary perspective view, entirely schematic in its representation, further illustrating the positional relationship between the gear case mechanism and the engine, and especially with respect to a certain torque sensing unit which is effectively interposed between the engine and the gear case mechanism.
Figure 3:
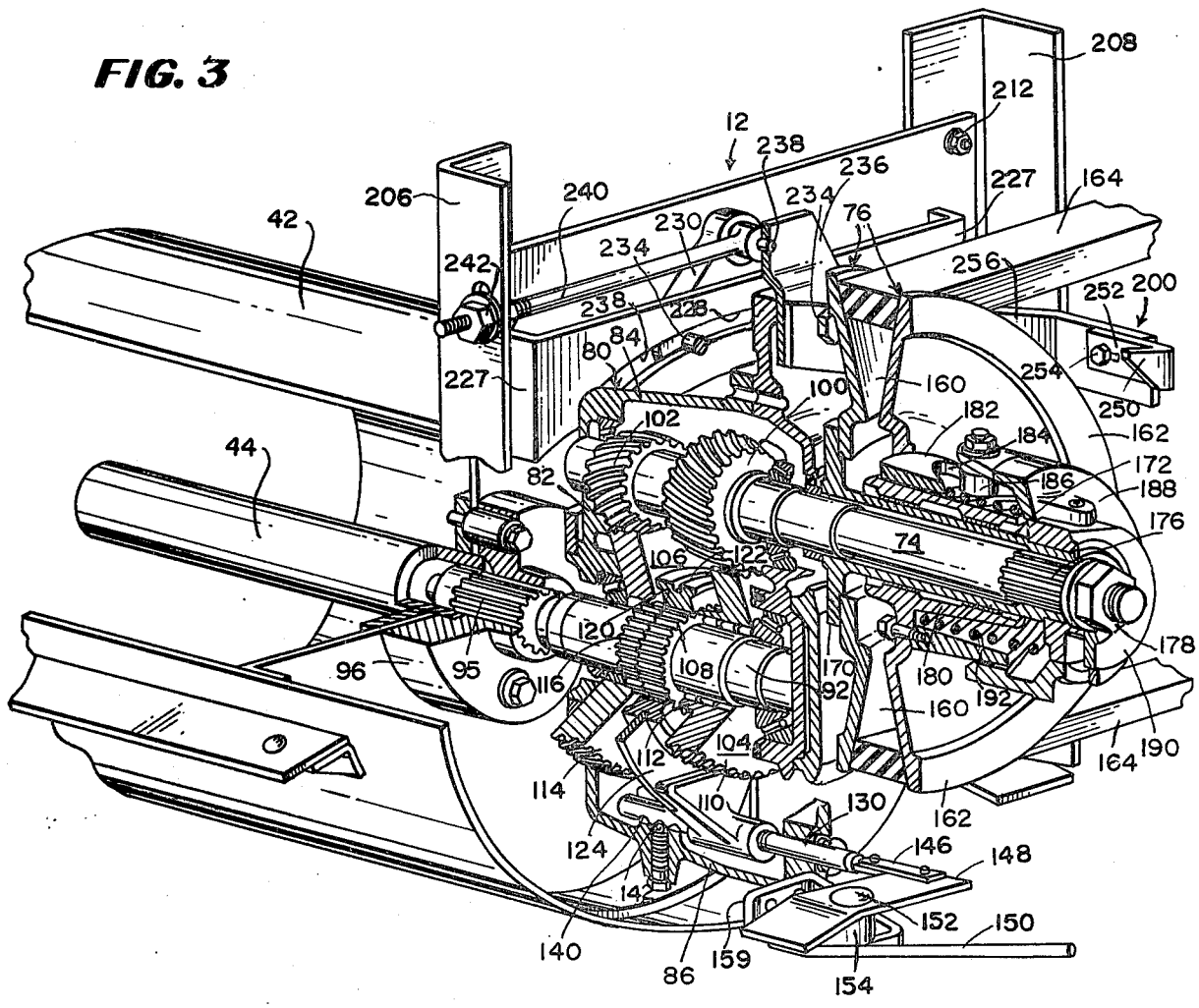
FIG. 3 is a three-quarter rear perspective view, largely in section, of the gear case mechanism, showing the input shaft thereof operatively associated with the torque sensing unit from which it receives its motivating power.

Before entering into a detail description of the present gear case mechanism 12 it is deemed pertinent to note that, as clearly shown in FIG. 3, such mechanism is intimately associated with the aforementioned torque sensing mechanism 10, it being deemed sufficient at the present time to point out that this intimate relationship exists largely by reason of the fact that the gear case mechanism is provided with an input shaft 74 which also constitutes the output shaft of the torque sensing mechanism 72, such shaft constituting the sole connection between the two components 12 and 72. On this basis, when discussing the details of the dual speed gear box arrangement of the present invention, the shaft 74 will be referred to as an input shaft and, when discussing the details of the torque sensing unit 72, it will be referred to as an output shaft. When discussing the combination which exists between the two components 72 and 12, the shaft 74 will be referred to as the common shaft. It is also deemed pertinent to note at this point that the shaft 74 constitutes a central or axial support for a variable diameter V-bent sheave 76 which constitutes an input sheave for the torque sensing unit 72, such sheave cooperating with a second sheave 78 such as appears in the schematic illustration of FIG. 2 and which is mounted on a jackshaft 79. Although as previously stated, the torque sensing unit 72 and the dual speed gear case arrangement are designed as counterparts, it is within the scope of the present invention to dispense with any torque sensing facilities whatsoever and utilize the shaft 74 for gear case input purposes by mounting a variable diameter V-belt sheave thereon exteriorly of the gear case proper, whether such input sheave be torque sensitive, speed sensitive or otherwise, the only criterion being that the sheave operate in association with a counterpart V-belt receiving sheave.

Figure 4:
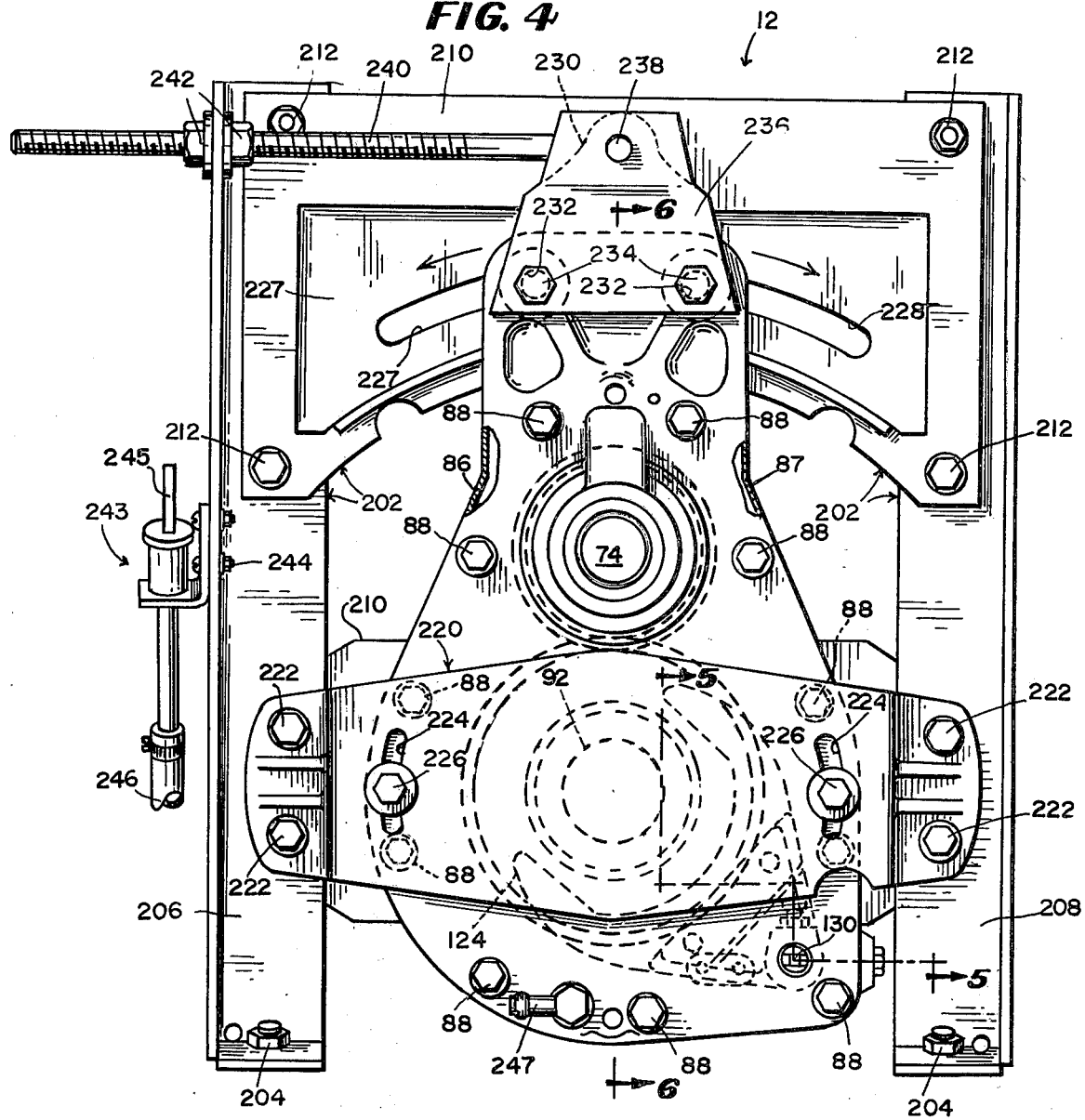
FIG. 4, is a rear view of the gear case mechanism.
Figure 6:
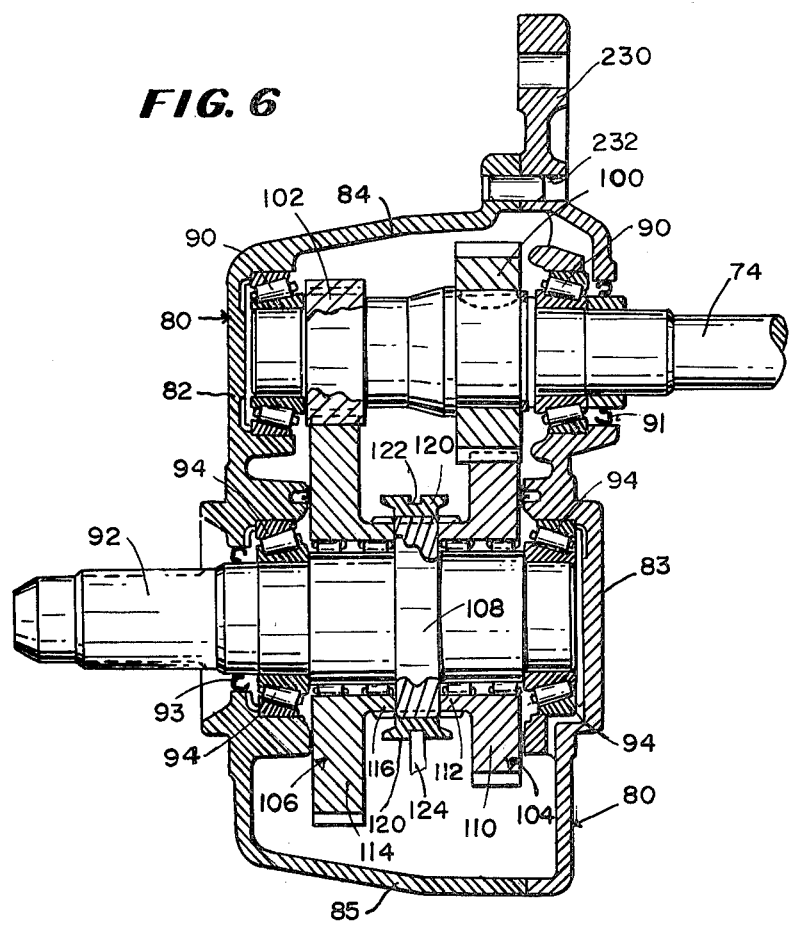
FIG. 6 is a sectional view taken substantially on the line 6—6 of FIG. 4 and showing the gear case housing only.

Considering now the nature of the present dual speed gear case arrangement 12, and referring particularly to FIGS. 4 and 6, such arrangement involves in its general organization a two-part housing or gear case proper 80 which rotatably supports the input shaft 74. The housing 80 includes front and rear walls 82 and 83, top and bottom walls 84 and 85 respectively, and side walls 86 and 87 respectively (FIG. 4). The two parts of the housing 80 are held together by bolts 88 which appear only in FIG. 4 and have been omitted in FIG. 6 in the interests of clarity. The terms "front" and "rear," as used herein throughout the remainder of the specification, as well as in the appended claims, refer to the positional relationship which the installed gear case mechanism 12 assumes with respect to the combine chassis 22 within which it is mounted.

The input shaft 74 is rotatably mounted in roller bearings 90 (FIG. 6) of the cone type and which are supported in the front and rear walls 82 and 83, the shaft projecting rearwardly through a lip seal 91 in the wall 83. An output shaft 92 is similarly supported in bearings 94 and it projects forwardly through a lip seal 93 in the wall 82 and has a spline connection 95 (FIG. 3) with the rotor shaft 44, the spline connection operating through a rear hub 96 associated with the rotor 40.

As best shown in FIGS. 3 and 6, the input shaft 74 has mounted thereon a relatively large diameter rear gear 100 and a relatively small diameter front gear 102, while the output shaft carries two compound gears 104 and 106, both such gears being freely and continuously rotatable on the output shaft 92. The two compound gears 104 and 106 are disposed on opposite sides of a medial raised annular splined rib 108 which is integral with the shaft 92 and the peripheral surface of which is formed with a series of splines. The rear compound gear 104 embodies a large diameter gear section 110 which meshes with the gear 100 and a small diameter gear section 112 having spline teeth thereon which are capable of longitudinal register with the splines on the periphery of the annular rib 108 on the shaft 92. Similarly, the forward compound gear 106 embodies a large diameter gear section 114 which meshes with the gear 102, and a small diameter gear section 116 which is provided with spline teeth thereon that are capable of longitudinal register with the splines on the periphery of the rib 108 on the shaft 92. The diameters of the raised annular rib 108 and of the spline tooth gear sections 112 and 116 are all equal, as well as are the number of splines or spline teeth thereon and their longitudinal disposition along the shaft 92 is such that they are arranged in side-by-side fashion.

Encompassing the spline area offered by the spline teeth of the gear sections 112 and 116 and the splines of the raised rib 108 is an internally splined gear ratio shifting collar 120, the internal splines of which are slidable longitudinally over such spline area. The longitudinal extent of the internal splines on the collar 120 is equal to or slightly less than longitudinal extent of the splines on the raised rib 108 so that when the collar is in register with the rib 108 as shown in FIG. 3 there is no side overlap, and the collar will remain motionless with the shaft 92 inasmuch as no power will be transmitted from the shaft 74 to the shaft 92 due to the fact that both compound gears 104 and 106, although rotating, are freely mounted on the shaft 92. This position of the collar 120 is considered to be the neutral position thereof and when it is effective no torque is applied to the combine rotor 42 so that the latter remains stationary or can be manually rotated for servicing.

The collar 120 is formed with an external annular groove 122 therein into which there extends an arcuate shifting fork 124 having facilities which subsequently will be set forth whereby it may be shifted in a fore and aft direction in order to selectively shift the collar 120 either forwardly or rearwardly into overlapping relationship with respect to one or the other of the gear sections 116 or 112. When the fork and collar are shifted rearwardly, the internal splines on the collar 120 will overlap both the splines on the rib 108 and the spline teeth on the gear section 112 of the rearward compound gear 104 and, at this time, power will be transmitted from the shaft 74 to the shaft 92, inasmuch as the collar 120 will effectively couple the raised rib 108 on the shaft 92 to the constantly rotating compound gear 104. When the fork and collar are shifted forwardly, the internal splines on the latter will overlap both the splines on the rib 108 and the spline teeth on the gear section 116 of the forward compound gear 106 so that power will be transmitted from the shaft 74 to the shaft 92 because the collar 120 will effectively couple the rib 108 to the constantly rotating compound gear 106. Shifting of the collar in the rearward direction will establish a high gear ratio drive since the effective diameter of the gear 100 is greater than the effective diameter of the gear 102. It will be understood that the high or low speed settings for the gear case mechanism 12 will be effected by the operator of the combine only at such time as the combine rotor 42 is motionless, it being inadvisable to attempt to shift the collar 120 when there is relative motion between the splined rib 108 and either of the spline-tooth gear sections 112 or 116.

Figure 5:
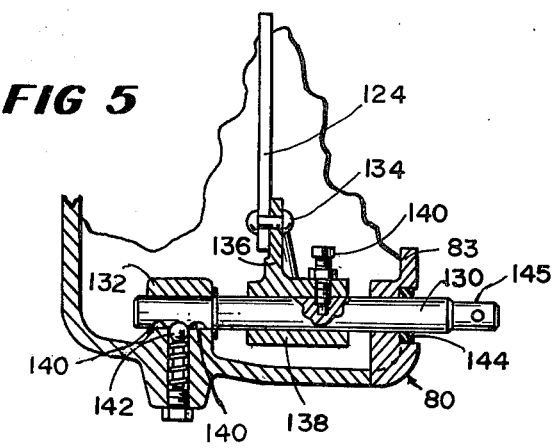
FIG. 5, is a sectional view taken substantially on the line 5—5 of FIG. 4.

Referring now to FIGS. 3, 4 and 5, wherein the aforementioned collar shifting facilities are best illustrated, these facilities include a longitudinally shiftable gearshift rod 130, (see particularly FIG. 5) which is slidably supported by an internal lug 132, and also by the rear wall 83 of the housing 80. The lower region of the shifting fork 124 is connected by a rivet 134 to an upstanding ear 136 provided on a collar 138, the latter being secured by a bolt and set collar device 140 to the gearshift rod 130. The forward end of the rod 130 is provided with a series of three detent notches 140 therein, such notches being designed for electric cooperation with a spring-pressed detent ball 142. A lip seal 144 or the like is provided near the rear end of the gearshift rod 130 to prevent escape of lubricant from the interior of the housing 80. As shown in FIGS. 3 and 5, the rear end of the gearshift rod 130 is provided with a flattened portion 145 which is connected by a link 146 (FIG. 3) to one end of a gear shifting lever 148, the other end of such lever being connected to a remote control rod 150 or the like. The lever 148 is pivoted medially of its ends as indicated at 152 to a bracket 159 which is secured to the rear surface of the gear case such that the shifting lever assembly oscillates with the gear case assembly.

From the above description it will be apparent that when the gearshift rod 130 is disposed in its medial position wherein the detent ball cooperates with the central detent notch 140, the shifting fork 124 will cause the shifting collar 120 to assume its medial position wherein the spline teeth thereon is wholly in register with the spline teeth on the raised rib 108, thus causing the gear case mchanism 12 to assume its neutral condition as previously described so that no motion is transmitted from the input shaft 74 to the output shaft 92, the combine rotor 42 thus remaining stationary. When the gearshift rod 130 is pulled rearwardly so that the detent ball enters the foremost detent notch 140, the high speed condition of which the gear case mechanism is capable of assuming will obtain, the power train involving the relatively large gear 100. When the gearshift rod 130 is pushed forwardly so that the detent ball enters the rearmost notch 140, the low speed condition of the gear case mechanism will be attained wherein the power train involves the relative small gear 102.

Referring now to FIG. 4, means are disclosed whereby the entire housing 80 of the gear case mechanism 12 may be regulably shifted about the axis of the output shaft 92 which drives the rotor 42. The purpose of thus shifting the housing 80 angularly is to shift the lateral component of motion of the V-belt sheave 76 toward or away from its counterpart sheave 78 (FIG. 2) for belt-tightening or regulating purposes as will be described in more detail subsequently. Before entering into a description of the angular shifting of the gear case housing 80, it is believed that a brief discussion of the nature of the torque sensing unit 72 is necessary inasmuch as such angular shifting of the housing 80 at any given time will exert a change in the relationship involved between the constituent parts of the torque sensing unit. Accordingly, and with reference to FIG. 3, the torque sensing unit 72, as previously stated, includes the variable diameter input sheave 76 which is effectively mounted on the input shaft 74 of the gear case mechanism 12, such shaft constituting the output shaft of the unit 72 so that it will be referred to as such in the following brief description. The input sheave 76 is comprised of two sheave halves having V-belt engaging sheave sections including an axially fixed front section 160 and an axially shiftable rear section 162. The V-belt by means of which the sheave 76 is driven is designated by the reference numeral 164. The sheave section 160 is secured to a radial flange 170 on the forward end of an inner cylindrical sleeve 172 which encompasses the shaft 74 and is drivingly mounted on such shaft by a splined connection 176 at the rear of the sleeve. The extreme rear end of the shaft 74 carries a threaded nut and washer arrangement 178 which, in combination with the short spline connection 176, retains the sleeve 172 in position on the shaft 74.

The axially shiftable sheave section 162 has a rearwardly extending generally cylindrical portion or outer sleeve 180 which is axially shiftable but freely rotatable on the inner sleeve 172. A generally cylindrical torque sensing cam 182 is secured by bolts to the axially shiftable rear sheave section 162 and is formed with a pair of cam recesses 184 in its rear circular edge. These cam recesses are designed for cooperation with respective cam follower rollers 186 carried on a sleeve 188 which, in turn, is pivoted for slight side-to-side swinging movement on a hub 190 which is splined to the inner sleeve 172 so that it rotates in unison therewith. A compression spring 192 is interposed between the hub 190 and sheave section 162 and yieldingly urges the latter toward the sheave section 160. Various other parts or components are embodied in the unit 72, some of which appear in FIG. 3 and others of which have been omitted. Among these components are various fastening devices such as bolts or the like for holding the parts together, roller bearings or bushings between relatively rotatable parts, and lubricating facilities. For a more detailed understanding of the nature of the torque sensing unit 72, reference may be had to the aforementioned application, Ser. No. 833,776, the entire disclosure of which, insofar as it is consistent with the present disclosure, is hereby incorporated in and made a part of the present application by reference thereto.

In the operation of the torque sensing unit 72, assuming that the sheave sections 160 and 162 are in their positions of close proximity to each other so that the belt 164 rides on the outer rim regions thereof, and assuming that the input sheave 76 is rotating in a counterclockwise direction as seen in FIG. 3, the power which is transmitted by the belt to the output shaft 74 of the unit 72 (input shaft of the load sensing mechanism 12) is equally divided through two friction-derived power trains which exist by reason of the fact that opposed axial forces are applied to the opposite sides of the belt 164 by the two sections 160 and 162. One-half of the power which is transmitted by the frictional drag of the belt is conducted through the sheave section 160 directly to the shaft 74 while the other half is fed into the sheave section 162 which is free to rotate relative to the sheave section 160 except insofar as it is restrained by the mating surfaces of the cam 182 and its follower rollers 186 which rotate in unison with the shaft 74. Thus, the magnitude of the compressive force (side force) on the belt 164 is the sum of the force exerted by the spring 192 on the sheave section 162 and the force exerted by the cam 182 on the cam follower rollers at such time as the sheave section 162 tends to overrun the sheave section 160 incident to an increase in the load which is encountered by the shaft 74, i.e. an increase in the load on the combine rotor 42. Briefly stated, such an increase in the load results in an increase in the compressive forces acting on the edges of the belt 164, thereby tensioning the belt only to the extent necessary to transmit the required amount of torque without incurring belt slippage, all in a manner which is fully set forth in the aforementioned copending application, Ser. No. 833,776.

Returning now to a discussion of the means whereby the entire housing 80 of the gear case mechanism 12 may be regulably shifted about the axis of its output shaft 92, as well as of the reason why such shifting is desirable, it will be noted from an inspection of FIG. 3 that when the gear case housing 80 is shifted throughout a limited degree in a clockwise direction about the axis of the shaft 92, the entire sheave assembly 76 will tend to move in the general direction of its associated sheave or pulley 78 which is schematically illustrated in FIG. 2. The tendency then is to lessen the tension in the belt 164. Conversely, when the gear case housing 80 is shifted in a counterclockwise direction, the tendency will be to tighten the belt 164. Such angular shifting of the gear case bodily in one direction or the other is necessary when belt-changing operations are resorted to, both for attaining the necessary clearance for belt removal and for attaining the correct belt tension when installing a new belt. To facilitate proper angular gear case adjustment to attain the desired belt tension during belt installation, a special gauge angle member 200 (FIGS. 3 and 7) is employed in a manner that will be set forth subsequently after the nature of the mounting means for the gear case housing 80 has been described.

As shown in FIG. 4, the gear case housing 80 is mounted for angular adjustment on a housing support 202 in the form of an inverted U-shaped frame-like structure. The support 202 is appropriately secured by bolts 204 to adjacent portions of the combine chassis 22.

The frame-like support includes vertical side channels 206 and 208 and an upper transverse support or bridge member 210 which is secured by bolts 212 to the side channels 206 and 208. The support 202 is thus a fixed structure and it is provided for the purpose of adjustably supporting the gear case housing 80 so that its inclination may be regulably adjusted for belt-tensioning purposes as previously indicated.

Accordingly, a transverse plate-like housing carrier 220 extends across the housing support 202 and is secured at its ends by bolts 222 to the side channels 206 and 208. The carrier 220 is formed with a pair of oppositely disposed arcuate slots 224 therein designed for reception therethrough of a pair of fastening or clamping bolts 226 which are threadedly received in the rear wall 83 of the housing 80. The curvature of the slots 224 is such that these slots are concentric with the axis of the output shaft 92. A third arcuate slot 228 is formed in an offset strut 227 which is welded at its ends to the bridge member 210 and the slot is so disposed that it is concentric with the exis of the output shaft 92. The top wall 84 of the housing 80 is formed with an upwardly projecting web-like ear 230 (FIGS. 3, 4 and 6) having a pair of bores 232 formed therein, such bores being designed for reception therethrough of a pair of fastening pin-bolt assemblies 234 by means of which a generally trapezoidal extension plate 236 is fixedly secured to the gear case housing 80 so that it projects upwardly thereabove. A pin 238 carried near the upper ends of the extension plate 238 and ear 230 is connected to one end of a threaded adjustment plate or drawbolt 240, the axial position of which may be regulated by means of a pair of cooperating clamping nuts 242 on opposite sides of one of the flanges of the side channel 206, the drawbolt passing through an opening in such flange. From the above description it will be apparent that by adjusting the positions of the nuts 242, the axial disposition of the rod 240 may be varied in order to regulate the inclination of the gear case housing 80 for belt tension adjusting purposes as previously described. Still referring to FIG. 4, the quantity of lubricating oil contained within the gear case housing 80 may be ascertained by means of a connected dip stick arrangement 243 which is secured by bolts 244 to the side channel 206 and includes a dip stick proper 245 that extends into a flexible riser tube 246 hich extends to a fitting 247 in the rear wall 83 of the houisng 80 near the bottom of the latter.

Figure 7:
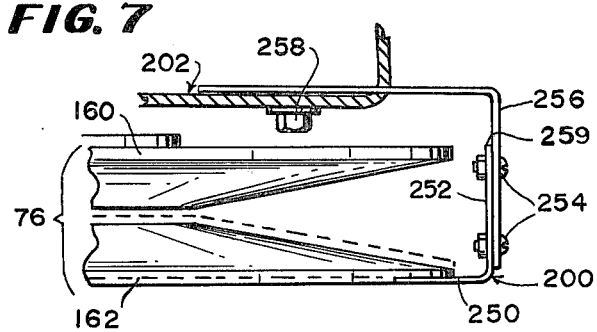
FIG. 7 is a fragmentary detail view, partly in elevation and partly in section, showing a belt tension gauge which is employed in connection with the invention.

The previously mentioned gauge angle member 200 of FIGS. 3 and 7 is provided for the purpose of facilitating correct belt tension, either during the installation of a fresh belt or of making a belt adjustment at any time during a period of combine operation. The angle member 200 is in the form of a sheet metal stamping of L-shape configuration and it includes a pointer-like arm 250 which extends in the transverse direction of the combine chassis 22 and an arm 252 which extends in the longitudinal direction of the combine. A pair of pin and slot connections 254 adjustably secure the arm 252 to the rearward end region of an angle bracket 256 which is bolted as at 258 to an appropriate area of the housing support 202. The gauge angle member 200 is thus positionally fixed relative to the combine chassis and, normally, when the gear case housing is in its correctly adjusted angular position, the pointer-like arm of the gauge angle member 200 lies in the general plane of the rim of the axially shiftable pulley section 162 of the input sheave 76 of the torque sensing unit 72. The distance which the pointer-like arm 250 is spaced from the rear wall of the housing 80 is critical, as also is the actual extent of the distance-measuring arm 252 as will become readily apparent when the manner in which the gauge angle member is actually used for belt tension adjustment purposes is set forth.

Assuming now that belt-replacement operations are necessary, the combine engine 38 will be disabled so as to terminate rotation of the input sheave 76, while at the same time the gear case mechanism 12 will be shifted to its neutral position as previously described by causing the gearshaft rod 130 (FIG. 5) to be moved to a position wherein the detent ball 142 enters the medial detent notch 140. The clamping bolts 226 and 234 (FIG. 4) will then be loosened to free the gear case housing 80 and allow angular adjustment thereof. The two clamping nuts 242 will be adjusted to swing the entire gear case housing 80 and allow angular adjustment thereof. The two clamping nuts 242 will be adjusted to swing the entire gear case housing 80 in a clockwise direction as viewed in FIG. 4, thus shifting the input shaft 74 of the mechanism 12, as well as the input sheave 76, toward the counterpart sheave 78 on the jackshaft 79 a sufficient distance to allow the belt 164 to be removed. To install a fresh V-belt, a reverse operation is resorted to but, in performing such reverse operation, the two pin-and-slot connections 254 (FIG. 7) are loosened and the forward edge of the arm 252 (such edge being specifically designated by the reference numeral 259 is aligned with the rim of the fixed axis sheave section 160. The pin and slot connections 254 are then tightened. Thereafter, with the V-belt 164 in position on the sheaves 76 and 78, and while rotating the sheaves and belt by hand with the gear case mechanism remaining in its neutral condition, the drawbolt 240 and its associated clamping screws 242 are manipulated until the gear case housing 80 assumes an angle where the rim of the axially shiftable sheave section 162 becomes aligned with the rear plane of the pointer-like arm 250 of the gauge angle member 200. The clamping screws 226 and 234 (FIG. 4) are finally tightened. Due to streching of belt 164 the axially shiftable sheave section 162 will move forwardly and when the forward plane of the pointer-like arm 250 becomes aligned with the rim of the axially shiftable sheave section 162 (broken like position of 162 in FIG. 7) the tension of the belt 164 should be readjusted. For this particular use the pointer-like arm 250 has a thickness of one-eight of an inch. It will be understood, of course, that this adjustment of the axially shiftable sheave section 162 is effected automatically upon swinging movement of the gear case housing 80, the belt 164 acting upon the opposed inner sides of the two sheave sections 160 and 162 until the compression spring 192 of the torque sensing unit 72 establishes a condition of equilibrium among the various parts of the unit.

The transmission of power from the engine 38 (FIG. 1) to the counterpart sheave 78 which drives the input sheave 76 of the torque sensing unit 72 may be accomplished in various ways, depending upon the character and positioning of the engine within the chassis 22 of the combine 10. In FIG. 1, the engine is shown as being provided with an output or drive shaft 260 from which power is supplied to the jackshaft 79 by means of a belt, pulley and idler arrangement 262. The jackshaft 79 has mounted thereon the aforementioned sheave 78 which appears in the schematic arrangement shown in FIG. 2, but which does not appear in FIG. 1 because it lies directly behind the variable pitch input sheave 76 of the torque sensing unit 72. The sheave 78, as aforesaid, serves to drive the variable diameter input sheave by means of the V-belt 164. The sheave 78 is a variable diameter sheave. Suitable means which form no part of the present invention are provided for varying the operating diameter of such sheave.

In FIG. 2, the power train which extends between the engine 38 and the input sheave 76 of the torque sensing unit 72 appears in a slightly different fashion and it should be borne in mind that the disclosure of this latter view is entirely a schematic one. In FIG. 2, the belt, pulley and idler arrangement 262, instead of connecting the engine shaft 260 directly to the jackshaft 79, extends between the driven shaft 264 of a gearbox 266 in driving relationship. Other means by which the jackshaft 79 may be driven from the engine shaft 260 are contemplated, the only criterion being that there be a driven jackshaft capable of carrying a counterpart sheave such as the sheave 78 which is capable of cooperating with the sheave 76 as described.

There is shown in FIG. 8 how the subject drive mechanism can be used to drive a multiple rotor combine specifically a dual rotor machine. The dual rotors are identified as 42 and 42A and although not shown in FIG. 8 each rotor would be rotatably supported on the combine chassis in the same manner as is the single rotor already described. Reference may be made to U.S. Pat. Nos. 3,640,710 and 3,626,472 for a more complete disclosure of a dual rotor machine. In FIG. 8 the output shaft 92 of gear case 80 extends through an elongated gear case 300 and after passing through this gear case 300 is drivingly coupled to rotor 42. Within gear case 300 there is a series of four gears 301, 302, 302 and 304. Gear 301 is secured by splines or keys to shaft 92 such that it rotates therewith. Gear 301 meshes with gear 302 which in turn meshes with gear 303 which in turn meshes with gear 304. Gear 304 is secured by splines or keys to an output shaft 392 which shaft is caused by the series of gears to rotate in the opposite direction to shaft 92. The gears 301-304 are of such a size that both shafts 92 and 392 rotate at the same revolutions per minute so that the relative timing of the rotors 42 and 42A is maintained.

Since some combine operators may have no need for a two speed gear housing one of the gear sets can be eliminated from the gear housing and thereby reduce this cost of a second gear rotation. As illustrated in FIG. 9 one set of gears can be eliminated from the gear housing without adversely effecting the remaining gear set. In doing this the same gear case 80, shafts 74 and 92 and bearings 90 and 94 can be used for a single speed gear case.

If a subsequent user desires the two speed feature the eliminated gear set can be added at a nominal cost. Also it should be noted that optimum output speed rages can be selected by choosing gear sets of the proper ratio.

Although the subject invention has been described and illustrated on a self-propelled combine it could of course be used on a pull-type combine in which rotary power for driving the rotor is obtained from the power take off shaft of the tractor that is pulling the combine. The term power source, as used in this application is intended to define either the engine 38 of a self-propelled combine or the inititial driven element of a pull-type combine.

From the above description of both the gear case mechanism 12 of the present invention, and the torque sensing mechanism 72 which is intimately associated therewith, as well as from the more detailed description of the mechanism 72 which is set forth in the aforementioned copending application, Ser. No. 833,776 which has been incorporated in the present application by reference thereto, it is believed that the function and operation of the gear case mechanism, considered singly or in combination with the torque sensing mechanism, will be fully understood.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In a self-propelled axial flow combine having a mobile chassis mounted on wheels, a threshing concave provided with a cooperating rotor including a rotor shaft which extends in the longitudinal direction of the combine, and an engine including an engine drive shaft, the combination therewith of improved transmission means drivingly connecting said drive shaft to said rotor shaft, said transmission means comprising a first V-belt sheave mounted on said chassis for rotation about a fixed axis, said first sheave is effectively a fixed sheave, means operatively connecting the drive shaft to said first sheave in driving relationship, a gear case housing having a forwardly projecting output shaft and a rearwardly projecting input shaft, said output and input shafts being disposed in spaced apart parallelism, means operatively connecting said output shaft to the rotor shaft in driving relationship, speed change gearing connecting said input shaft and output shaft, a second V-belt sheave mounted on said input shaft for rotation in unison therewith, a V-belt trained around said first and second sheaves, the second sheave is a variable diameter sheave and includes a pair of sheave sections capable of relative axial shifting movement toward and away from each other, and a compression spring yieldingly urges said sheave sections toward each other in V-belt-engaging relationship, said housing being capable of limited tilting movement about the axis of said output shaft in order to shift said input shaft and sheave carried thereby toward and away from said first sheave for belt tension regulating purposes, releasable means for securing said housing in selected positions of inclination, said engine being disposed rearwardly of the gear case housing, and wherein the means for operatively connecting the engine drive shaft to said first sheave includes a jackshaft on which such first sheave is mounted, and a belt, pulley and idler arrangement effectively extends between said engine drive shaft and the jackshaft.

2. In a harvesting combine, the combination set forth in claim 1, wherein a fixed plate-like carrier extends transversely of the combine chassis, said carrier being provided with a pair of oppositely disposed arcuate slots therein which are concentric with the longitudinal axis of the output shaft and said releasable means for securing the housing in selected positions of inclination comprises clamping bolts which project through said arcuate slots.

3. In a harvesting combine, the combination set forth in claim 1, whereon the gear case housing is tiltably mounted on a frame-like support fixedly mounted on said chassis, said support including vertical side members and upper and lower transverse members bridging the distance between said side members, said lower transverse member being formed with a pair of oppositely disposed arcuate slots which are concentric with the axis of the output shaft, said upper transverse member being formed with a third arcuate slot which likewise is concentric with the axis of the output shaft, and said releasable means for securing the housing in selected positions of inclination comprises clamping bolts which project through said arcuate slots and serve, when tightened, to secure the housing in selected positions of inclination.

4. In a harvesting combine, the combination set forth in claim 3 including, additionally, an elongated threaded drawbolt pivoted at one end to said housing in the vicinity of said third arcuate slot and having a pair of cooperating clamping nuts thereon which are effective against the opposite sides of a fixed portion of the frame-like support to regulate the angular position of said gear case housing.

5. In a harvesting combine having a mobile chassis mounted on drive wheels, a threshing concave provided with a cooperating rotor including a rotor shaft, and an engine provided with a drive shaft, the combination therewith of improved transmission means drivingly connecting said motor drive shaft to said rotor shaft, said transmission means comprising a fixed diameter V-belt sheave mounted on the chassis for rotation about a fixed axis, means operatively connecting the engine drive shaft to said sheave in driving relationship, a gear case housing having an output shaft and an input shaft projecting therefrom, said output and input shaft being disposed in spaced apart parallelism, speed change gearing connecting said input and output shafts, means operatively connecting the output shaft to the rotor shaft in driving relationship, a variable diameter V-belt sheave mounted on the input shaft, said latter sheave including an axially fixed sheave section rotatable in unison with the input shaft and a freely rotatable axially shiftable sheave section movable toward and away from the fixed section, spring means yieldingly biasing the axially shiftable section toward the axially fixed section and toward a condition of maximum sheave diameter, a V-belt trained around said fixed diameter sheave and the variable diameter sheave, and interengaging cam means effective between the sheave sections for augmenting the biasing action of said spring means in response to relative rotation between the sheave sections as a result of an increase in the load applied to said output shaft, and consequently the axially fixed sheave section, by said rotor, said housing being capable of limited tilting movement about the axis of said output shaft in order to shift the input shaft and sheave carried thereby toward and away from said fixed diameter sheave for belt tension regulating purposes, and releasable means for securing said housing in selected positions of inclination.

6. In a harvesting combine, the combination set forth in claim 5, wherein said combine is an axial flow combine in which the rotor shaft extends in the longitudinal direction of the combine chassis, the engine is disposed rearwardly of the gear case housing, the input shaft projects rearwardly of the housing, and the output shaft projects forwardly of the housing.

7. In a harvesting combine, the combination set forth in claim 6, wherein the means for operatively connecting the engine drive shaft to said fixed diameter V-belt sheave includes a jackshaft on which such sheave is mounted, and a belt pulley and idler arrangement effectively extends between said engine drive shaft and the jackshaft.

8. In a harvesting combine, the combination set forth in claim 6, wherein a fixed plate-like carrier extends transversely of the combine chassis said carrier being provided with a pair of oppositely disposed arcuate slots therein which are concentric with the longitudinal axis of the output shaft, and said releasable means for securing the housing in selected positions of inclination comprises clamping bolts which project through said arcuate slots.

9. In a harvesting combine, the combination set forth in claim 6, wherein the gear case housing is tiltably mounted on a frame-like support fixedly mounted on the chassis, said support including vertical side members and upper and lower transverse members bridging the distance between said side members, said lower transverse member being formed with a pair of oppositely disposed arcuate slots which are concentric with the axis of the output shaft, and said upper transverse member being formed with a third arcuate slot which likewise is concentric with the axis of the output shaft, and said releasable means for securing the housing in selected positions of inclination comprises clamping bolts which project through said arcuate slots and serve to secure the housing in selected positions of inclination.

10. In a harvesting combine, the combination set forth in claim 9 including, additionally, an elongated threaded drawbolt pivoted at one end to said housing in the vicinity of said third arcuate slot and having a pair of cooperating clamping nuts thereon which are effective against the opposite sides of a fixed portion of the frame-like support to regulate the angular position of said gear case housing.

11. In a harvesting combine, the combination set forth in claim 5 including, additionally, a first belt-installation gauge fixedly mounted on said chassis and designed for longitudinal alignment with the rim of said axially fixed sheave section prior to installation of the V-belt around said fixed diameter sheave, and a second belt installation gauge indicia on said chassis designed for longitudinal alignment with the rim of said axially shiftable sheave section after installation of the V-belt.

12. In a harvesting combine, the combination set forth in claim 5, wherein a belt installation gauge angle member of right angle configuration is fixedly mounted on said chassis and includes a transversely extending arm and a longitudinally extending arm the distal end of which is designed for longitudinal alignment with the rim of said axially fixed sheave section prior to installation of the V-belt around said fixed diameter and variable diameter sheaves, and the transversely extending arm is designed for longitudinal alignment with the rim of the axially shiftable sheave section after installation of the V-belt around the sheave sections.

13. In an axial flow combine having a mobile chassis, a pair of side-by-side concaves with cooperating rotors including rotor shafts, a power source including a drive shaft, means drivingly connecting said rotor shafts such that rotary motion from one shaft will be transmitted to the other shaft at the same rotational speed but in the opposite direction, transmission means drivingly connecting said drive shaft to said one shaft, said transmission means comprising a first sheave mounted on said chassis for rotation about a fixed axis, means operatively connecting said drive shaft to said first sheave in driving relationship, a gear case housing having an output shaft and an input shaft projecting therefrom, said output and input shafts being disposed in spaced apart parallelism, means operatively connecting said output shaft to said one shaft in driving relationship, speed change gearing connecting said input shaft and output shaft, a second sheave mounted on said input shaft for rotation in unison therewith, a belt trained around said first and second sheaves, said housing being capable of limited tilting movement about the axis of said output shaft in order to shift said input shaft and second sheave carried thereby toward and away from said first sheave for belt tensioning regulating purposes, and releasable means for securing said housing in selected positions of inclination.

14. The invention as set forth in claim 13 in which said second sheave includes an axially fixed sheave section rotatable in unison with said input shaft and a freely rotatable axially shiftable sheave section movable toward and away from the fixed section, spring means yieldingly biasing the axially shiftable section toward the axially fixed section and toward a condition of maximum sheave diameter, a V-belt trained around said fixed diameter sheave and the variable diameter sheave, and interengaging cam means effective between the sheave sections for augmenting the biasing action of said spring means in response to relative rotation between the sheave sections as a result of an increase in the load applied to said output shaft and consequently the axially fixed sheave section by said rotors.

* * * * *

UNITED STATES PATENT OFFICE
CERTIFICATE OF CORRECTION

Patent No. 4,160,456        Dated Jul. 10, 1979

Inventor(s)     Robert W. Hawkins et al

It is certified that error appears in the above-identified patent and that said Letters Patent are hereby corrected as shown below:

Column 12, line 27, delete "fixed" (second occurrence) and insert --variable--;

Column 13, lines 27, 44, 54 and 67 delete "fixed" and insert --first variable--;

line 36, after "a" insert --second--;

line 45, delete "the" and insert --said second--;

Column 14, lines 41 and 52, delete "fixed" and insert --first variable--;

line 52, after "and" insert --said second--;

Column 16, line 9, delete "fixed diameter" and insert --first--;

line 9, delete "variable diameter" and insert --second--.

Signed and Sealed this

Second Day of September 1980

[SEAL]

Attest:

SIDNEY A. DIAMOND

*Attesting Officer*     *Commissioner of Patents and Trademarks*